United States Patent
Hwang et al.

(10) Patent No.: US 11,938,714 B2
(45) Date of Patent: Mar. 26, 2024

(54) ADHESIVE MEMBER, MANUFACTURING METHOD THEREOF, AND ELECTRONIC DEVICE INCLUDING THE SAME

(71) Applicant: Samsung Electronics Co., Ltd., Gyeonggi-do (KR)

(72) Inventors: Daum Hwang, Gyeonggi-do (KR); Sangin Baek, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 665 days.

(21) Appl. No.: 17/036,981

(22) Filed: Sep. 29, 2020

(65) Prior Publication Data

US 2021/0127514 A1  Apr. 29, 2021

(30) Foreign Application Priority Data

Oct. 29, 2019 (KR) .......................... 10-2019-0135720

(51) Int. Cl.
*H05K 5/02* (2006.01)
*B32B 7/12* (2006.01)
(Continued)

(52) U.S. Cl.
CPC ................ *B32B 7/12* (2013.01); *B32B 27/08* (2013.01); *B32B 37/12* (2013.01);
(Continued)

(58) Field of Classification Search
None
See application file for complete search history.

(56) References Cited

U.S. PATENT DOCUMENTS

| 9,232,031 B1 * | 1/2016 | Shoval ..................... H01Q 1/40 |
| 2006/0009251 A1 | 1/2006 | Noda et al. |

(Continued)

FOREIGN PATENT DOCUMENTS

| JP | 06-037147 | 2/1994 |
| JP | 2006-024087 | 1/2006 |

(Continued)

OTHER PUBLICATIONS

International Search Report dated Dec. 8, 2020 issued in counterpart application No. PCT/KR2020/012180, 7 pages.

*Primary Examiner* — Anthony J Frost
(74) *Attorney, Agent, or Firm* — The Farrell Law Firm, P.C.

(57) ABSTRACT

An electronic device may include a housing including a support member in an inner space thereof, at least one conductive pattern disposed on the support member, a cover member combined with at least a part of the housing, a first adhesive member disposed between the housing and the cover member to be overlapped at least in part with the at least one conductive pattern when the cover member is viewed from above, and a first masking film member attached to the first adhesive member and disposed between the first adhesive member and the at least one conductive pattern to be overlapped with the at least one conductive pattern when the cover member is viewed from above. A surface of the first masking film member facing the at least one conductive pattern may include a photosensitive adhesive layer containing a photo-initiator and having an adhesive force reduced or removed through irradiation of ultraviolet (UV) rays.

10 Claims, 12 Drawing Sheets

(51) Int. Cl.
    *B32B 27/08*     (2006.01)
    *B32B 37/12*     (2006.01)
    *B32B 38/00*     (2006.01)
    *B32B 38/14*     (2006.01)
    *C09J 7/29*     (2018.01)
    *H04B 1/3827*     (2015.01)
    *B32B 37/26*     (2006.01)
    *B32B 38/04*     (2006.01)

(52) U.S. Cl.
CPC .......... *B32B 38/0008* (2013.01); *B32B 38/14* (2013.01); *C09J 7/29* (2018.01); *H04B 1/3827* (2013.01); *B32B 2037/1253* (2013.01); *B32B 2037/268* (2013.01); *B32B 2038/042* (2013.01); *B32B 2255/10* (2013.01); *B32B 2307/412* (2013.01); *B32B 2310/0831* (2013.01); *B32B 2457/20* (2013.01); *C09J 2203/326* (2013.01); *C09J 2301/122* (2020.08)

(56) References Cited

U.S. PATENT DOCUMENTS

| | | | |
|---|---|---|---|
| 2009/0227089 A1* | 9/2009 | Plaut | C09J 5/00 |
| | | | 438/464 |
| 2014/0313746 A1 | 10/2014 | Song et al. | |
| 2017/0285471 A1* | 10/2017 | Kawakami | G03F 7/2002 |
| 2018/0024377 A1* | 1/2018 | Kumar | G02C 7/102 |
| | | | 351/159.69 |
| 2018/0076412 A1* | 3/2018 | Kim | H01L 21/02304 |
| 2018/0203483 A1 | 7/2018 | Kwak et al. | |
| 2019/0150307 A1 | 5/2019 | Park et al. | |
| 2020/0381807 A1 | 12/2020 | Park | |

FOREIGN PATENT DOCUMENTS

| | | |
|---|---|---|
| KR | 1020140124578 | 10/2014 |
| KR | 1604069 | 3/2016 |
| KR | 1841243 | 3/2018 |
| KR | 1896865 | 9/2018 |
| KR | 1020190020519 | 3/2019 |

* cited by examiner

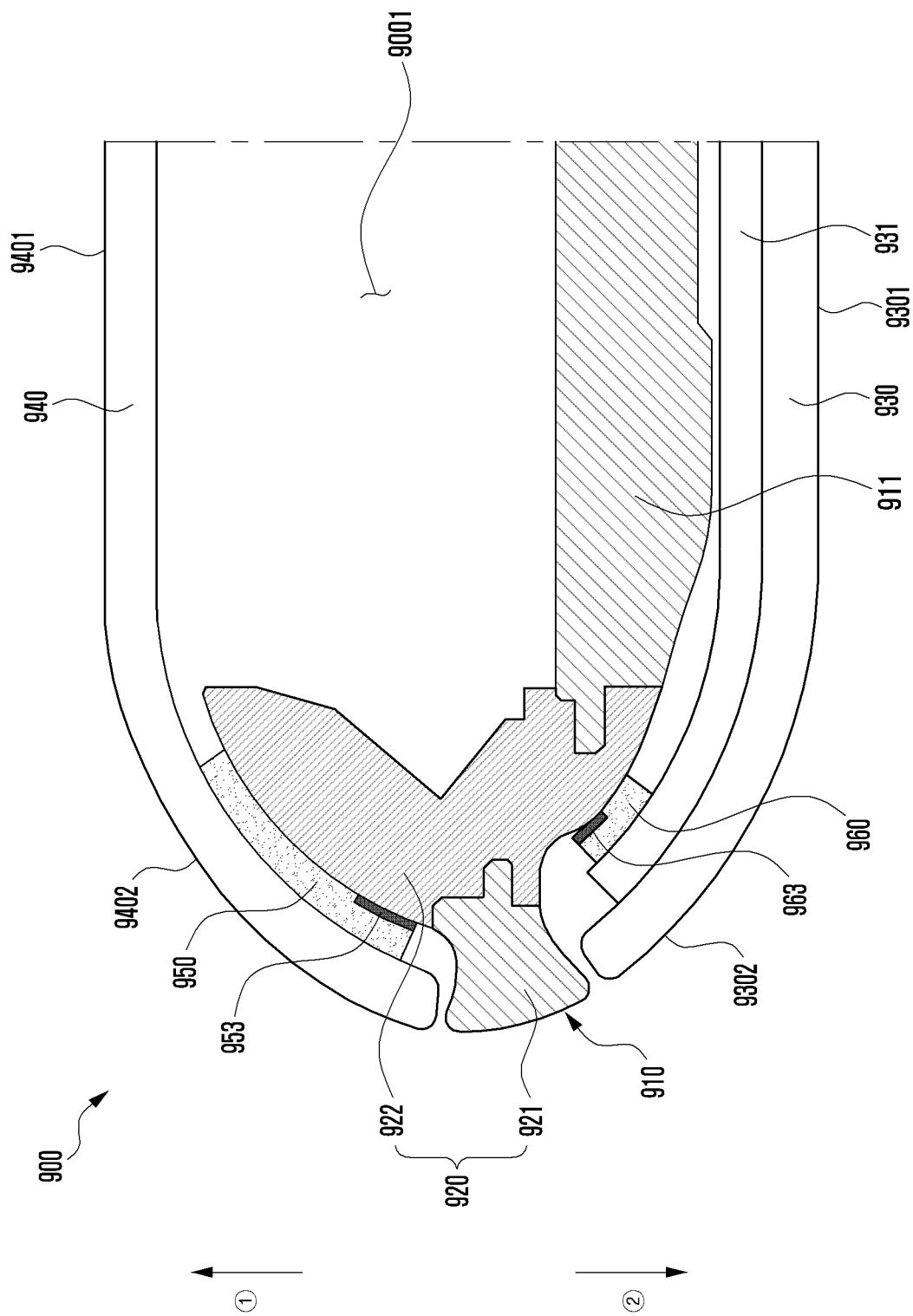

ADHESIVE MEMBER, MANUFACTURING METHOD THEREOF, AND ELECTRONIC DEVICE INCLUDING THE SAME

CROSS-REFERENCE TO RELATED APPLICATION(S)

This application is based on and claims priority under 35 U.S.C. § 119 to Korean Patent Application No. 10-2019-0135720, filed on Oct. 29, 2019, in the Korean Intellectual Property Office, the entire disclosure of which is incorporated herein by reference.

BACKGROUND

1. Field

The disclosure relates generally to an adhesive member, a manufacturing method thereof, and an electronic device including the same.

2. Description of Related Art

A current trend in developing electronic devices is slimming a device body, i.e., reducing a thickness of the electronic device. In addition, electronic devices are being developed with increased stiffness, to strengthen their design aspects, and to differentiate functional features.

Normally, an electronic device includes a plurality of electronic components disposed in an inner space thereof. Each electronic component should be efficiently arranged in the inner space of the electronic device to perform its unique function without impairing functions of the other components.

The electronic device may include at least one conductive pattern disposed on an injected member made of a dielectric material in the inner space. The conductive pattern may be used as an antenna pattern or used to expand a ground area of the electronic device. The conductive pattern may be formed on a surface of the injected member by performing a laser direct structuring (LDS) process, by coating a conductive material, or by attaching a patterned conductive sheet.

The electronic device may include a lateral member (i.e., sides) that provide the inner space by being combined with at least one cover member (e.g., a front cover or front plate and/or a rear cover or rear plate). In order to fix the cover member to the lateral member and/or to provide a sealing structure for waterproofing between the cover member and the lateral member, the electronic device may include an adhesive member disposed along edges between the cover member and the lateral member. In order to improve an adhesive force, the adhesive member may be extended onto at least a part of the injected member disposed in the inner space.

When the adhesive member is extended to a position overlapping the conductive pattern disposed on the injected member, the conductive pattern may be damaged by the adhesive force of the adhesive member if the adhesive member is detached from the injected member for some reason. Thus, a masking film member may be applied to an overlap region between the adhesive member and the conductive pattern so that the adhesive force of the adhesive member does not affect the conductive pattern. However, applying the masking film member needs to dispose the masking film member between a release liner (e.g., a release film or release tape) and the adhesive member during a manufacturing process of the adhesive member, and also needs a certain adhesive force between the masking film member and the release liner to maintain stable positions during a punching process.

Unfortunately, the adhesive force of the masking film member may cause damage to the conductive pattern as described above. However, if the adhesive force is removed from the masking film member, an accurate punching process may not be possible because it is difficult to secure the release liner. In addition, if any adhesive member is used for the release liner to fix the masking film member, an accurate punching process may be possible, but when the release liner is removed after the process, the adhesiveness of an adhesive surface of the adhesive member may be significantly reduced.

SUMMARY

Accordingly, this disclosure has been provided to address the above-described problems and provide at least the advantages described below.

An aspect of the disclosure is to provide an electronic device that includes a housing including a support member in an inner space thereof, a conductive pattern disposed on the support member, a cover member combined with the housing, a first adhesive member disposed between the housing and the cover member to be overlapped at least in part with the conductive pattern, when the cover member is viewed from above, and first masking film member attached to the first adhesive member and disposed between the first adhesive member and the conductive pattern to be overlapped with the conductive pattern when the cover member is viewed from above. A surface of the first masking film member facing the conductive pattern includes a photosensitive adhesive layer including a photo-initiator and having a reduced or removed adhesive force through irradiation of ultraviolet (UV) rays.

Another aspect of the disclosure is to provide an adhesive member that includes a first adhesive member, a masking film member attached to the first adhesive member, and a photosensitive adhesive layer disposed on the masking film member, including a photo-initiator, and having a reduced or removed adhesive force through irradiation of UV rays.

Another aspect of the disclosure is to provide a method for manufacturing an adhesive member, which includes attaching a masking film base material to a release liner through a photosensitive adhesive layer, punching the masking film base material, attaching an adhesive member to the masking film base material on the release liner, punching the adhesive member and the release liner, and irradiating light onto the photosensitive adhesive layer through the release liner to reduce or remove an adhesive force of the photosensitive adhesive layer.

BRIEF DESCRIPTION OF THE DRAWINGS

The above and other aspects, features, and advantages of certain embodiments of the disclosure will be more apparent from the following detailed description, taken in conjunction with the accompanying drawings:

FIG. 9 illustrates a cross-sectional view of an electronic device including adhesive members according to an embodiment.

DETAILED DESCRIPTION

Hereinafter, embodiments of the disclosure will be described in detail with reference to the accompanying drawings.

Figure 1:
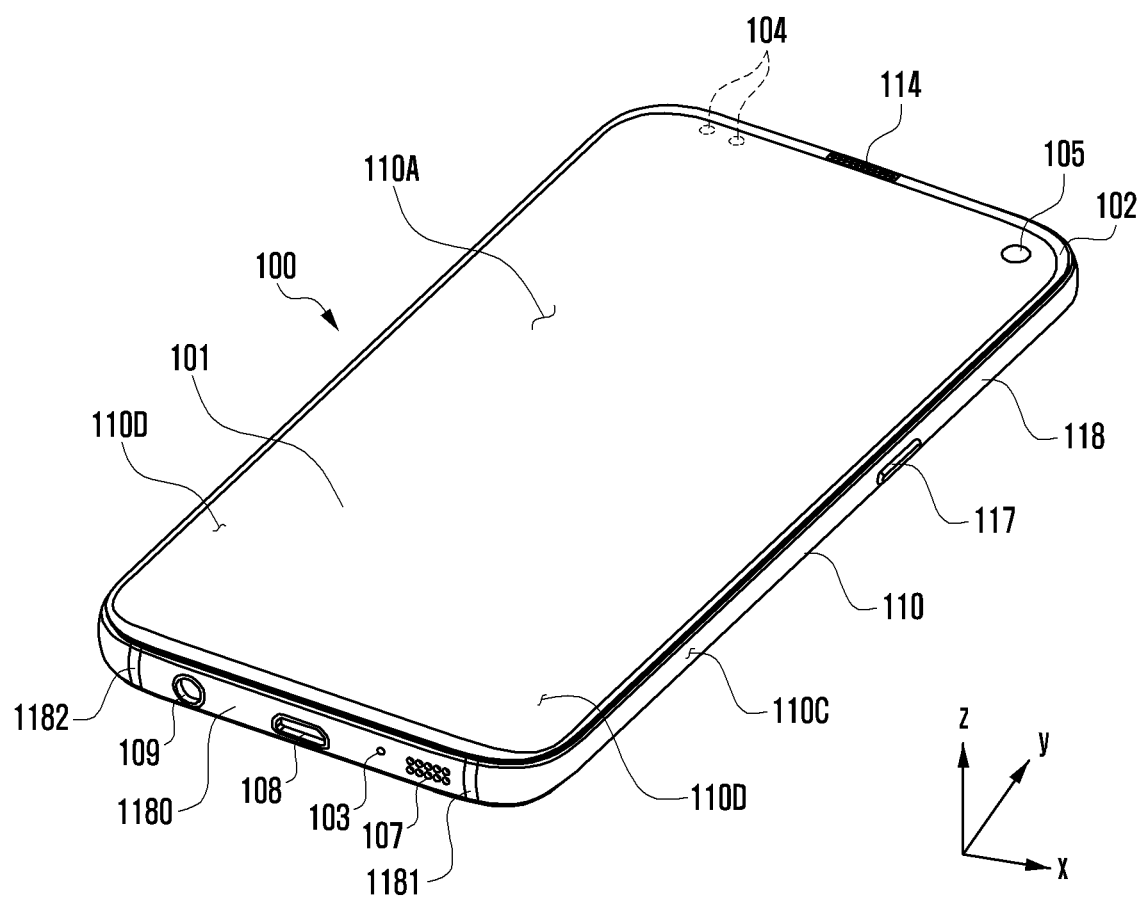
FIG. 1 illustrates a perspective view of a front surface of a mobile electronic device according to an embodiment.
Figure 2:
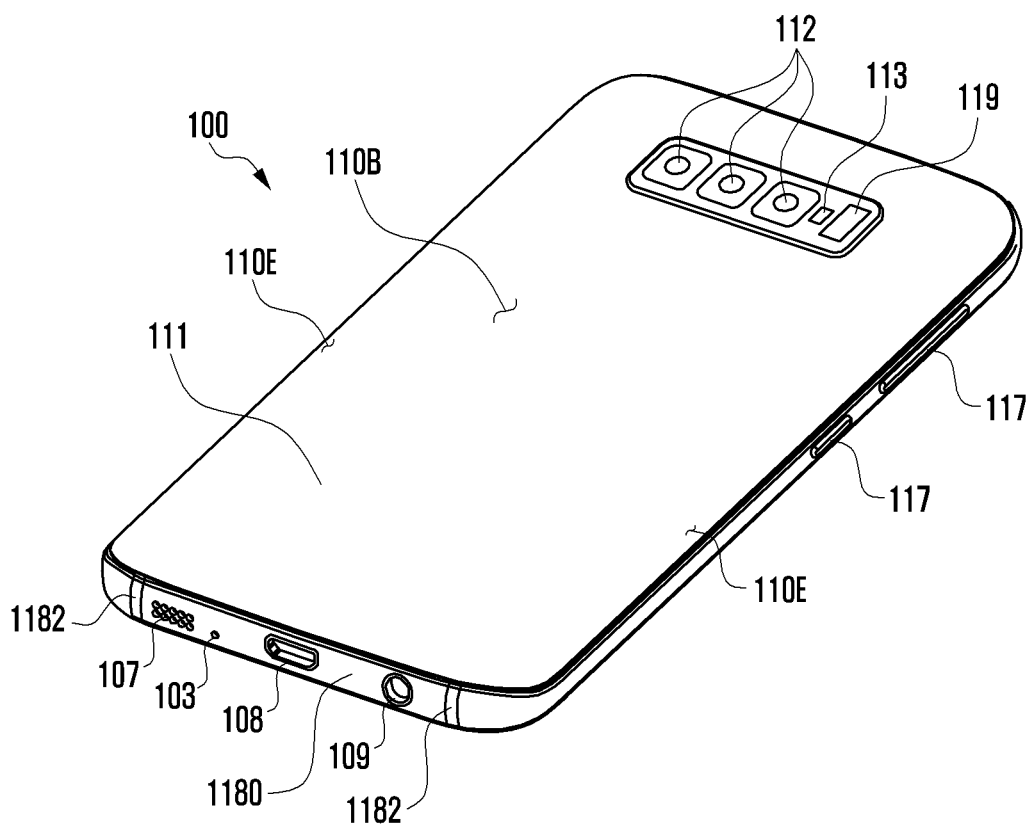
FIG. 2 illustrates a perspective view of a rear surface of a mobile electronic device according to an embodiment.

FIG. 1 illustrates a perspective view showing a front surface of a mobile electronic device according to an embodiment of the disclosure, and FIG. 2 illustrates a perspective view showing a rear surface of the mobile electronic device shown in FIG. 1 according to an embodiment of the disclosure.

Referring to FIGS. 1 and 2, a mobile electronic device 100 may include a housing 110 that includes a first surface (or front surface) 110A, a second surface (or rear surface) 110B, and a lateral surface 110C that surrounds a space between the first surface 110A and the second surface 110B. The housing 110 may refer to a structure that forms a part of the first surface 110A, the second surface 111B, and the lateral surface 110C. The first surface 110A may be formed of a front plate 102 (e.g., a glass plate or polymer plate coated with a variety of coating layers) at least a part of which is substantially transparent. The second surface 110B may be formed of a rear plate 111 which is substantially opaque. The rear plate 111 may be formed of, for example, coated or colored glass, ceramic, polymer, metal (e.g., aluminum, stainless steel (STS), or magnesium), or any combination thereof. The lateral surface 110C may be formed of a lateral bezel structure (or "lateral member") 118 which is combined with the front plate 102 and the rear plate 111 and includes a metal and/or polymer. The rear plate 111 and the lateral bezel structure 118 may be integrally formed and may be of the same material (e.g., a metallic material such as aluminum).

The front plate 102 may include two first regions 110D disposed at long edges thereof, respectively, and bent and extended seamlessly from the first surface 110A toward the rear plate 111. Similarly, the rear plate 111 may include two second regions 110E disposed at long edges thereof, respectively, and bent and extended seamlessly from the second surface 110B toward the front plate 102. The front plate 102 (or the rear plate 111) may include only one of the first regions 110D (or of the second regions 110E). The first regions 110D or the second regions 110E may be omitted in part. When viewed from a lateral side of the mobile electronic device 100, the lateral bezel structure 118 may have a first thickness (or width) on a lateral side where the first region 110D or the second region 110E is not included, and may have a second thickness, being less than the first thickness, on another lateral side where the first region 110D or the second region 110E is included.

The mobile electronic device 100 may include at least one of a display 101, audio modules 103, 107 and 114, sensor modules 104 and 119, camera modules 105, 112 and 113, a key input device 117, a light emitting device, and connector holes 108 and 109. The mobile electronic device 100 may omit at least one (e.g., the key input device 117 or the light emitting device) of the above components, or may further include other components.

The display 101 may be exposed through a substantial portion of the front plate 102, for example. At least a part of the display 101 may be exposed through the front plate 102 that forms the first surface 110A and the first region 110D of the lateral surface 110C. Outlines (i.e., edges and corners) of the display 101 may have substantially the same form as those of the front plate 102. The spacing between the outline of the display 101 and the outline of the front plate 102 may be substantially unchanged in order to enlarge the exposed area of the display 101.

A recess or opening may be formed in a portion of a display area of the display 101 to accommodate at least one of the audio module 114, the sensor module 104, the camera module 105, and the light emitting device. At least one of the audio module 114, the sensor module 104, the camera module 105, a fingerprint sensor, and the light emitting element may be disposed on the back of the display area of the display 101. The display 101 may be combined with, or adjacent to, a touch sensing circuit, a pressure sensor capable of measuring the touch strength (pressure), and/or a digitizer for detecting a stylus pen. At least a part of the sensor modules 104 and 119 and/or at least a part of the key input device 117 may be disposed in the first region 110D and/or the second region 110E.

The audio modules 103, 107 and 114 may correspond to a microphone hole 103 and speaker holes 107 and 114, respectively. The microphone hole 103 may contain a microphone disposed therein for acquiring external sounds and, in a case, contain a plurality of microphones to sense a sound direction. The speaker holes 107 and 114 may be classified into an external speaker hole 107 and a call receiver hole 114. The microphone hole 103 and the speaker holes 107 and 114 may be implemented as a single hole, or a speaker (e.g., a piezo speaker) may be provided without the speaker holes 107 and 114.

The sensor modules 104 and 119 may generate electrical signals or data corresponding to an internal operating state of the mobile electronic device 100 or to an external environmental condition. The sensor modules 104 and 119 may include a first sensor module 104 (e.g., a proximity sensor) and/or a second sensor module (e.g., a fingerprint sensor) disposed on the first surface 110A of the housing 110, and/or a third sensor module 119 (e.g., a heart rate monitor (HRM) sensor) and/or a fourth sensor module (e.g., a fingerprint sensor) disposed on the second surface 110B of the housing 110. The fingerprint sensor may be disposed on the second surface 110B as well as the first surface 110A (e.g., the display 101) of the housing 110. The electronic device 100 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 105, 112 and 113 may include a first camera device 105 disposed on the first surface 110A of the electronic device 100, and a second camera device 112 and/or a flash 113 disposed on the second surface 110B. The camera module 105 or the camera module 112 may include one or more lenses, an image sensor, and/or an image signal processor (ISP). The flash 113 may include, for example, a light emitting diode (LED) or a xenon lamp. Two or more lenses (IR cameras, wide angle and telephoto lenses) and image sensors may be disposed on one side of the electronic device 100.

The key input device 117 may be disposed on the lateral surface 110C of the housing 110. The mobile electronic device 100 may not include some or all of the key input device 117 described above, and the key input device 117 which is not included may be implemented in another form such as a soft key on the display 101. The key input device 117 may include the sensor module disposed on the second surface 110B of the housing 110.

The light emitting device may be disposed on the first surface 110A of the housing 110. For example, the light emitting device may provide status information of the electronic device 100 in an optical form. The light emitting device may provide a light source associated with the operation of the camera module 105. The light emitting device may include, for example, an LED, an IR LED, or a xenon lamp.

The connector holes 108 and 109 may include a first connector hole 108 adapted for a connector (e.g., a universal serial bus (USB) connector) for transmitting and receiving power and/or data to and from an external electronic device, and/or a second connector hole 109 adapted for a connector (e.g., an earphone jack) for transmitting and receiving an audio signal to and from an external electronic device.

Some sensor modules 105 of camera modules 105 and 212, some sensor modules 104 of sensor modules 104 and 119, or an indicator may be arranged to be exposed through a display 101. For example, the camera module 105, the sensor module 104, or the indicator may be arranged in the internal space of an electronic device 100 so as to be brought into contact with an external environment through an opening of the display 101, which is perforated up to a front plate 102. In another embodiment, some sensor modules 104 may be arranged to perform their functions without being visually exposed through the front plate 102 in the internal space of the electronic device. For example, in this case, an area of the display 101 facing the sensor module may not require a perforated opening.

According to various embodiments, the lateral bezel structure 118 may be formed of a conductive member. According to an embodiment, the lateral bezel structure 118 may include a conductive portion 1180 separated through a pair of non-conductive portions 1181 and 1182 spaced apart at a certain interval. According to an embodiment, the conductive portion 1180 may be electrically connected to a wireless communication circuit disposed inside the electronic device 100 and thereby used as an antenna (e.g., a legacy antenna) operating in a specific frequency band.

Figure 3:
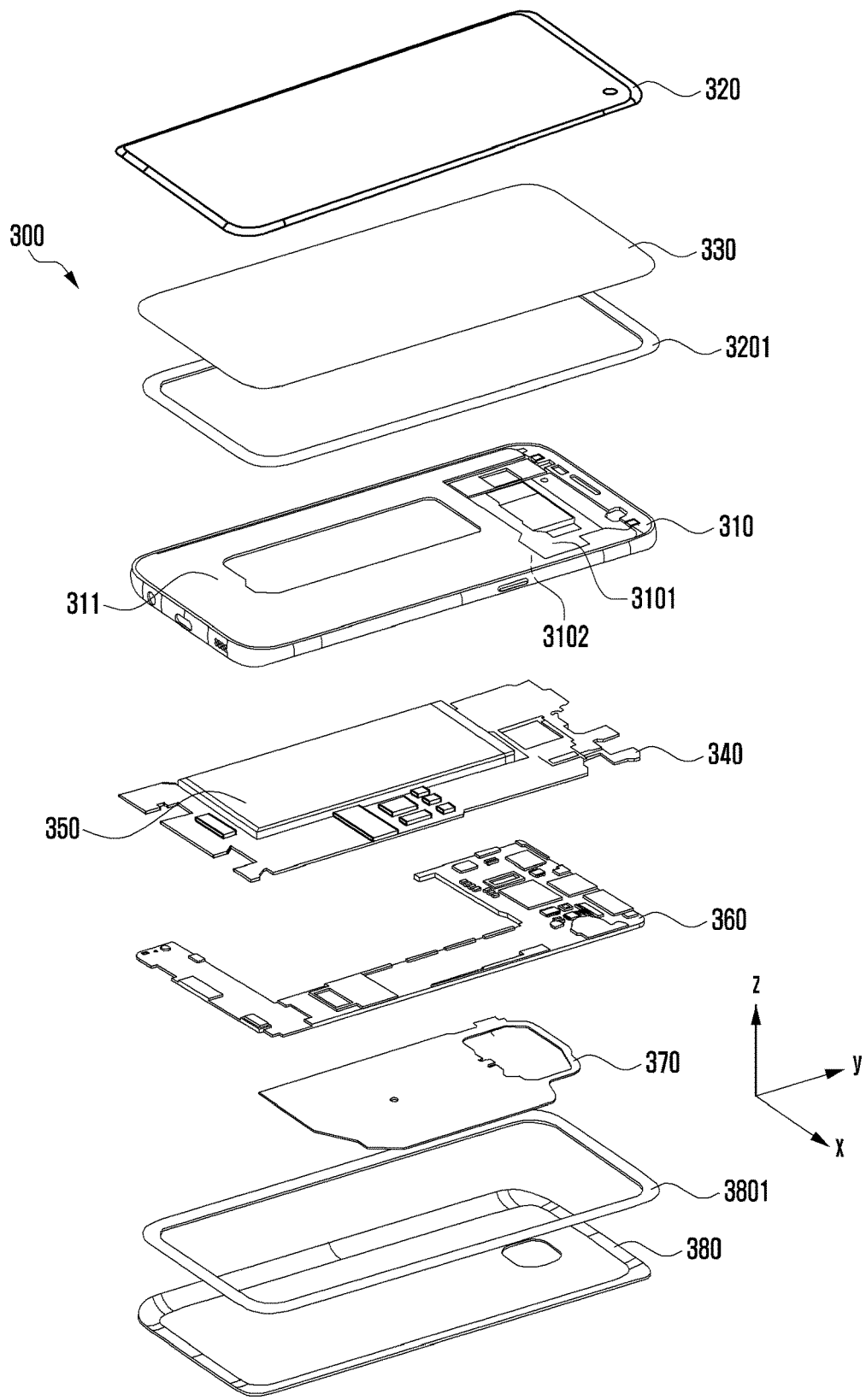
FIG. 3 illustrates an exploded view of a mobile electronic device according to an embodiment.

FIG. 3 illustrates an exploded perspective view showing a mobile electronic device shown in FIG. 1 according to an embodiment of the disclosure.

Referring to FIG. 3, a mobile electronic device 300 may include a lateral bezel structure 310, a first support member 311 (e.g., a bracket), a front plate 320, a display 400, an electromagnetic induction panel, a printed circuit board (PCB) 340, a battery 350, a second support member 360 (e.g., a rear case), an antenna 370, and a rear plate 380. The mobile electronic device 300 may omit at least one (e.g., the first support member 311 or the second support member 360) of the above components or may further include another component. Some components of the electronic device 300 may be the same as or similar to those of the mobile electronic device 100 shown in FIG. 1 or FIG. 2, thus, descriptions thereof are omitted below.

The first support member 311 is disposed inside the mobile electronic device 300 and may be connected to, or integrated with, the lateral bezel structure 310. The first support member 311 may be formed of, for example, a metallic material and/or a non-metal (e.g., polymer) material. The first support member 311 may be combined with the display 400 at one side thereof and also combined with the PCB 340 at the other side thereof. On the PCB 340, a processor, a memory, and/or an interface may be mounted. The processor may include, for example, one or more of a central processing unit (CPU), an application processor (AP), a graphics processing unit (GPU), an ISP, a sensor hub processor, or a communications processor (CP).

The memory may include, for example, one or more of a volatile memory and a non-volatile memory.

The interface may include, for example, a high definition multimedia interface (HDMI), a USB interface, a secure digital (SD) card interface, and/or an audio interface. The interface may electrically or physically connect the mobile electronic device 300 with an external electronic device and may include a USB connector, an SD card/multimedia card (MMC) connector, or an audio connector.

The battery 350 is a device for supplying power to at least one component of the mobile electronic device 300, and may include, for example, a non-rechargeable primary battery, a rechargeable secondary battery, or a fuel cell. At least a part of the battery 350 may be disposed on substantially the same plane as the PCB 340. The battery 350 may be integrally disposed within the mobile electronic device 300, and may be detachably disposed from the mobile electronic device 300.

The antenna 370 may be disposed between the rear plate 380 and the battery 350. The antenna 370 may include, for example, a near field communication (NFC) antenna, a wireless charging antenna, and/or a magnetic secure transmission (MST) antenna. The antenna 370 may perform short-range communication with an external device, or transmit and receive power required for charging wirelessly. An antenna structure may be formed by a part or combination of the lateral bezel structure 310 and/or the first support member 311.

According to various embodiments, the lateral member 310 may be formed of a combination of different materials. For example, the lateral member 310 may be formed through an injection process using a mold in which a non-conductive member (e.g., polymer) is injected into a conductive member (e.g., metal). According to an embodiment, the electronic device 300 may include one adhesive member 3801 disposed between the rear plate 380 and the lateral member 310. According to an embodiment, the electronic device 300 may include another adhesive member 3201 disposed between the front plate 320 and the lateral member 310 or between the display 330 and the lateral member 310.

According to an embodiment, these adhesive members 3801 and 3201 may perform adhesive and waterproof functions. According to an embodiment, the adhesive members 3801 and 3201 may include a masking film member (e.g., the masking film member 453 in FIG. 4) according to embodiments of the disclosure. As will be described below, the masking film member may be disposed at least partially in the inner space of the electronic device 300 to protect a conductive pattern (e.g., an antenna pattern) disposed in the inner from the adhesive force of the adhesive members 3801 and 3201.

Figure 4:
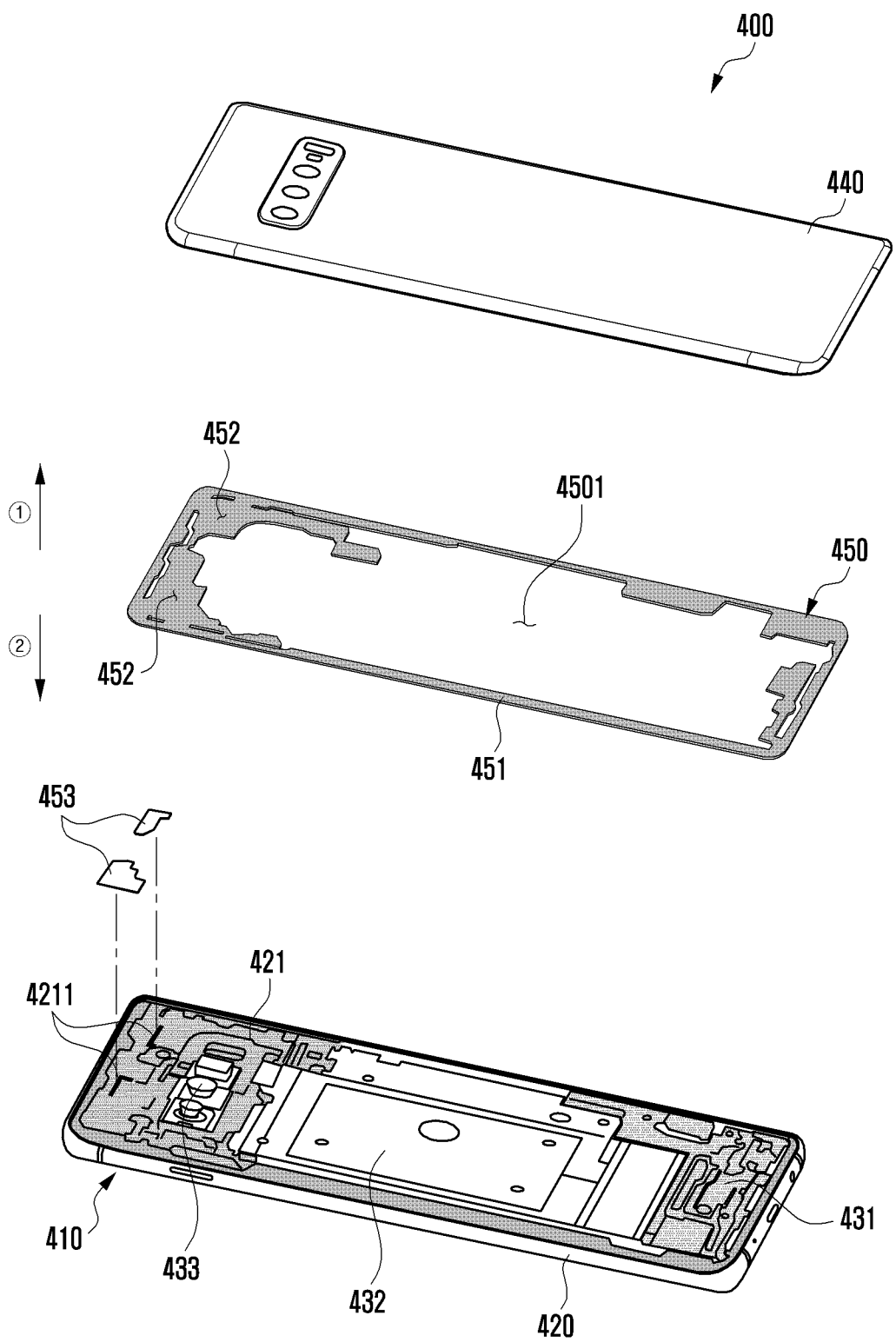
FIG. 4 illustrates an exploded view of an electronic device according to an embodiment.

FIG. 4 illustrates an exploded view of an electronic device according to an embodiment.

The electronic device 400 illustrated in FIG. 4 may be similar, at least in part, to the electronic device 100 illustrated in FIG. 1 or the electronic device 300 illustrated in FIG. 3.

Referring to FIG. 4, the electronic device 400 includes a housing 410 including a lateral member 420, and at least one cover member 440 disposed on the lateral member 420 to seal an inner space of the housing 410. The lateral member 420 includes a support member 421 extended into an inner space of the electronic device 400. The support member 421 may be extended from the lateral member 420, or the support member 421 may be separately provided in the inner space of the electronic device 400 and structurally coupled with the lateral member 420. The lateral member 420 may include a conductive member and a polymer member injected into the conductive member. The lateral member 420 may be formed of only the conductive member. The lateral member 420 may be formed of only the polymer member. The support member 421 may be formed of the polymer member extended from the lateral member 420.

The electronic device 400 includes a plurality of electronic components such as a PCB 431, a battery 432, a camera module 433, and a conductive pattern 4211, which are disposed in the inner space. The conductive pattern 4211 may be used as an antenna pattern or may be used to expand a ground area of the electronic device.

The electronic device 400 may include the at least one conductive pattern 4211 disposed in the inner space and used as the antenna pattern. The conductive pattern 4211 is disposed on the support member 421 (e.g., an antenna carrier), which is extended from the lateral member 420 into the inner space of the electronic device 400. The conductive pattern 4211 may be formed on a surface of the support member 421 by performing a laser direct structuring (LDS) process, by coating a conductive material, or by attaching a patterned conductive sheet. The conductive pattern 4211 may be electrically connected to a wireless communication circuit disposed on the PCB 431. The wireless communication circuit may be configured to transmit and/or receive a radio signal in a specific frequency band (e.g., a legacy band) through the conductive pattern 4211. The conductive pattern 4211 may be electrically connected to the wireless communication circuit on the PCB 431 through a contact pad and/or a contact terminal. The conductive pattern 4211 may be structurally coupled with the support member 421 or may be printed on an antenna carrier provided separately from the support member 421.

The electronic device 400 includes at least one adhesive member 450, which is disposed between the cover member 440 and the lateral member 420, provides an adhesive force to attach the cover member 440 to the lateral member 420, seals the inner space, and provides a waterproof and/or dustproof function. The adhesive member 450 may have a closed loop space 4501 between the lateral member 420 and the cover member 440. The adhesive member 450 includes an edge portion 451 formed along the edge of the lateral member 420, and at least one extended portion 452 extended from the edge portion 451 toward the closed loop space 4501. When the adhesive member 450 attaches the cover member 440 to the lateral member 420, the extended portion 452 may attach the cover member 440 to the support member 421, thereby improving the adhesive force between the lateral member 420 and the cover member 440.

When the cover member 440 is viewed from above, the extended portion 452 of the adhesive member 450 may be overlapped with the conductive pattern 4211 formed on the support member 421. In this case, when a slip phenomenon occurs during the use of the electronic device, when a lift phenomenon occurs due to a difference in air pressure, or when the adhesive member 450 is detached for maintenance, the conductive pattern 4211 may be affected by the adhesive force of the adhesive member 450 and thereby torn or broken. Therefore, according to an embodiment of the disclosure, the electronic device 400 includes at least one masking film member 453 disposed to prevent the adhesive force of the adhesive member 450 from affecting the conductive pattern 4211. The masking film member 453 may be a film member formed of a polymer material (e.g., polyethylene terephthalate (PET)).

Figure 5A:
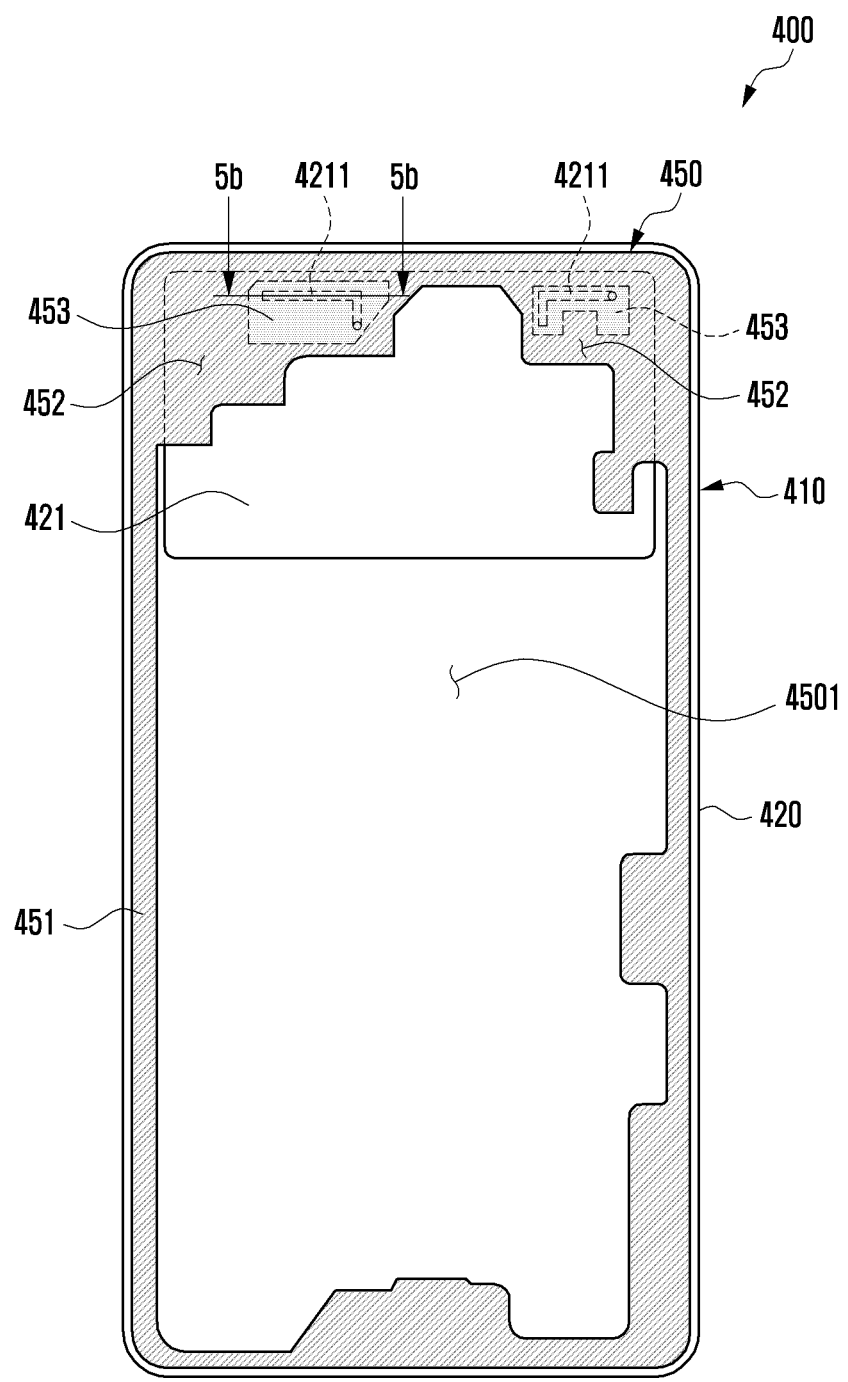
FIG. 5A illustrates an arrangement relationship between a masking film member and an adhesive member in an electronic device according to an embodiment.
Figure 5B:
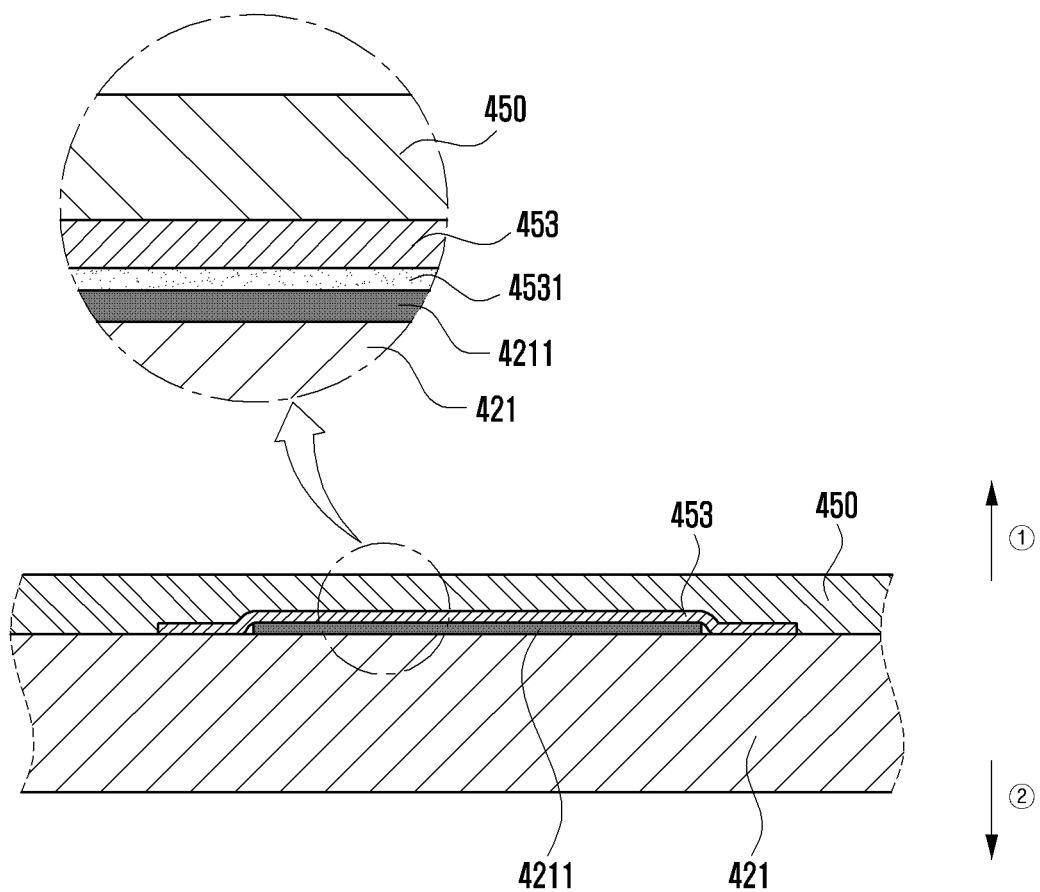
FIG. 5B illustrates a cross-sectional view of the electronic device of FIG. 5A, taken along the line 5b-5b, according to an embodiment.

FIG. 5A illustrates an arrangement relationship between a masking film member and an adhesive member in an electronic device according to an embodiment. FIG. 5B illustrates a cross-sectional view of the electronic device of FIG. 5A, taken along the line 5b-5b, according to an embodiment.

Referring to FIG. 5A, the electronic device 400 includes the adhesive member 450 that includes the edge portion 451 attached to the edge of the lateral member 420 and also includes the extended portion 452 extended from the edge portion 451 onto at least a part of the support member 421 disposed in the inner space of the electronic device 400. When a cover member is viewed from above, the conductive pattern 4211 may be disposed on the support member 421 overlapped at least in part with the extended portion 452 of the adhesive member 450.

When a slip phenomenon occurs during the use of the electronic device, when a lift phenomenon occurs due to a difference in air pressure, or when the adhesive member 450 is detached for maintenance, the conductive pattern 4211 may be affected by the adhesive force of the adhesive member 450 and thereby torn or broken. Thus, the adhesive member 450 may include the at least one masking film member 453 disposed between the extended portion 452 and the support member 421 to be overlapped with the conductive pattern 4211 when the cover member is viewed from above. A surface of the masking film member 453 is attached to the adhesive member 450, whereas the opposite surface facing the conductive pattern 4211 maintains a relatively weak or removed adhesive force. Therefore, when the adhesive member 450 is detached, the masking film member 453 may prevent the conductive pattern 4211 from being damaged.

Referring to FIG. 5B, the masking film member 453 includes a photosensitive adhesive layer 4531, which overlaps the conductive pattern 4211, provides a reduced or removed adhesive force to the conductive pattern 4211, and contains a photo-initiator. The photosensitive adhesive layer 4531 may provide an adhesive force to a release liner (e.g., a release film or release tape) during a manufacturing process of the masking film member 453 to provide an efficient manufacturing process, and also provide a reduced or removed adhesive force through irradiation of light (e.g., UV rays) when disposed between the cover member and the support member 421. Thus, the photosensitive adhesive layer 4531 of the masking film member 453 may prevent the damage of the conductive pattern 4211 due to the adhesive force when the adhesive member 450 is detached.

The photosensitive adhesive layer 4531 may be formed through a combination of an acrylic monomer, a photopolymerization oligomer, a reaction monomer, a photo-initiator, and/or additives. The principle that the adhesive force is reduced or removed when the photosensitive adhesive layer 4531 is irradiated with UV rays may be caused by polymerization of the acrylic monomer and the photopolymerization oligomer. For example, when almost all bonding functional groups in the photosensitive adhesive layer 4531 complete polymerization, the internal cohesive force rises rapidly, and the bonding with an adhesion surface may be eliminated. The principle of removing the adhesive force of the photosensitive adhesive layer 4531 may be caused by a radical polymerization reaction during the UV irradiation. The radical reaction is not highly dependent on temperature and has a property of fast curing speed, which may be advantageous. For example, in a photo-curing reaction, when the photo-initiator receives UV rays, activated radicals may be generated in a photo-excited state. The photopolymerization oligomer (intermediate) blended with the acrylic monomer having adhesion can cause a polymerization reaction at a rapid rate by the activated radicals. Depending on the type and composition ratio of the oligomer, adhesive properties such as initial adhesive strength, delamination strength, and retention strength may be influenced.

Figure 6:
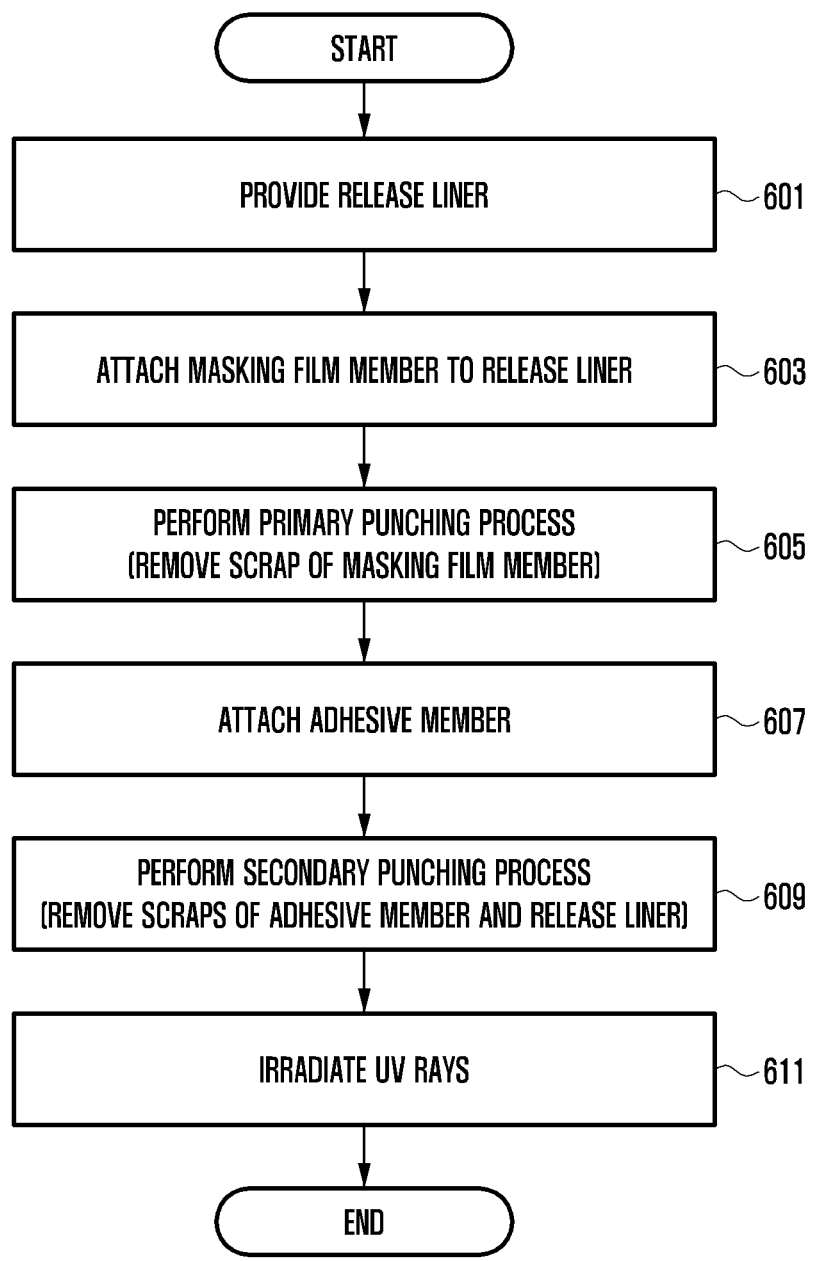
FIG. 6 is a flow chart illustrating a manufacturing process of an adhesive member according to an embodiment.
Figure 7:
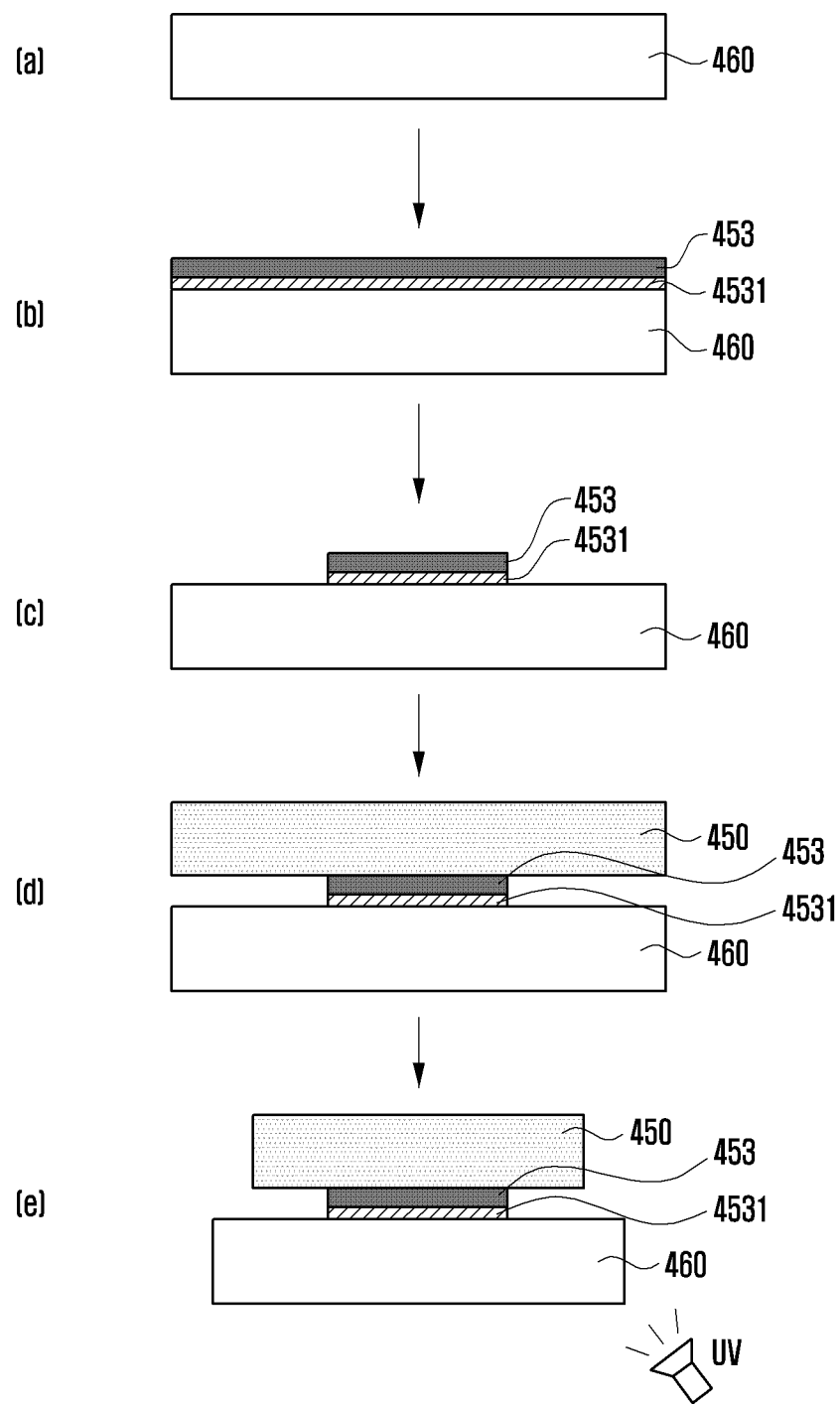
FIG. 7 illustrates a manufacturing process of an adhesive member according to an embodiment.

FIG. 6 is a flow chart illustrating a manufacturing process of an adhesive member according to an embodiment. FIG. 7 illustrates a manufacturing process of an adhesive member according to an embodiment.

Referring to FIGS. 6 and 7, at step 601 of FIG. 6 and step (a) of FIG. 7, a release liner 460 (e.g., a release film or release tape) is provided. The release liner 460 may include a polymer film (e.g., PET).

At step 603 of FIG. 6 and step (b) of FIG. 7, the masking film member 453 is disposed on one surface of the release liner 460. The masking film member 453 may contain the photosensitive adhesive layer 4531. Before UV rays are irradiated, the photosensitive adhesive layer 4531 may be attached to the release liner 460 with a certain adhesive force.

At step 605 of FIG. 6 and step (c) of FIG. 7, the masking film member 453 attached to one surface of the release liner 460 is formed into a desired shape through a primary punching process. For example, the masking film member 453 may be punched to have a size and shape overlapped with the conductive pattern (e.g., the conductive pattern 4211 in FIG. 5A) disposed on the support member (e.g., the support member 421 in FIG. 5A), and then scrap may be removed.

At step 607 of FIG. 6 and step (d) of FIG. 7, the adhesive member 450 is attached to an upper surface of the masking film member 453. The upper surface of the masking film member 453 facing the adhesive member 450 may be attached to the adhesive member 450 through the adhesive force of the adhesive member 450.

At step 609 of FIG. 6 and step (e) of FIG. 7, the adhesive member 450 is formed to have a desired (i.e., to be finally applied to the electronic device) size and shape through a secondary punching process. As described above, the masking film member 453 has been attached to the release liner 460 with a certain adhesive force through the photosensitive adhesive layer 4531, so that the punching process can be performed reliably without any movement of the masking film member 453. Thereafter, at step 611 of FIG. 6 and step (e) of FIG. 7, UV rays may be irradiated through the release liner 460. For efficient UV irradiation onto the photosensitive adhesive layer 4531, the release liner 460 may be formed of a translucent or transparent material. The photosensitive adhesive layer 4531 may be formed to have different colors before and after the UV irradiation. The photosensitive adhesive layer 4531 may be transparent before the UV irradiation and colored after the UV irradiation. In this case, the release liner 460 may have transparency to allow the colored photosensitive adhesive layer 4531 to be visually identified. The photosensitive adhesive layer 4531 exposed to UV rays may have reduced or removed adhesive force.

The adhesive member 450 finally completed through the secondary punching process may be attached to the cover member. In addition, with the release liner 460 removed, the adhesive member 450 may be attached to the lateral member. The masking film member 453 having reduced or removed adhesive force may be disposed to cover the conductive pattern.

Figure 8:
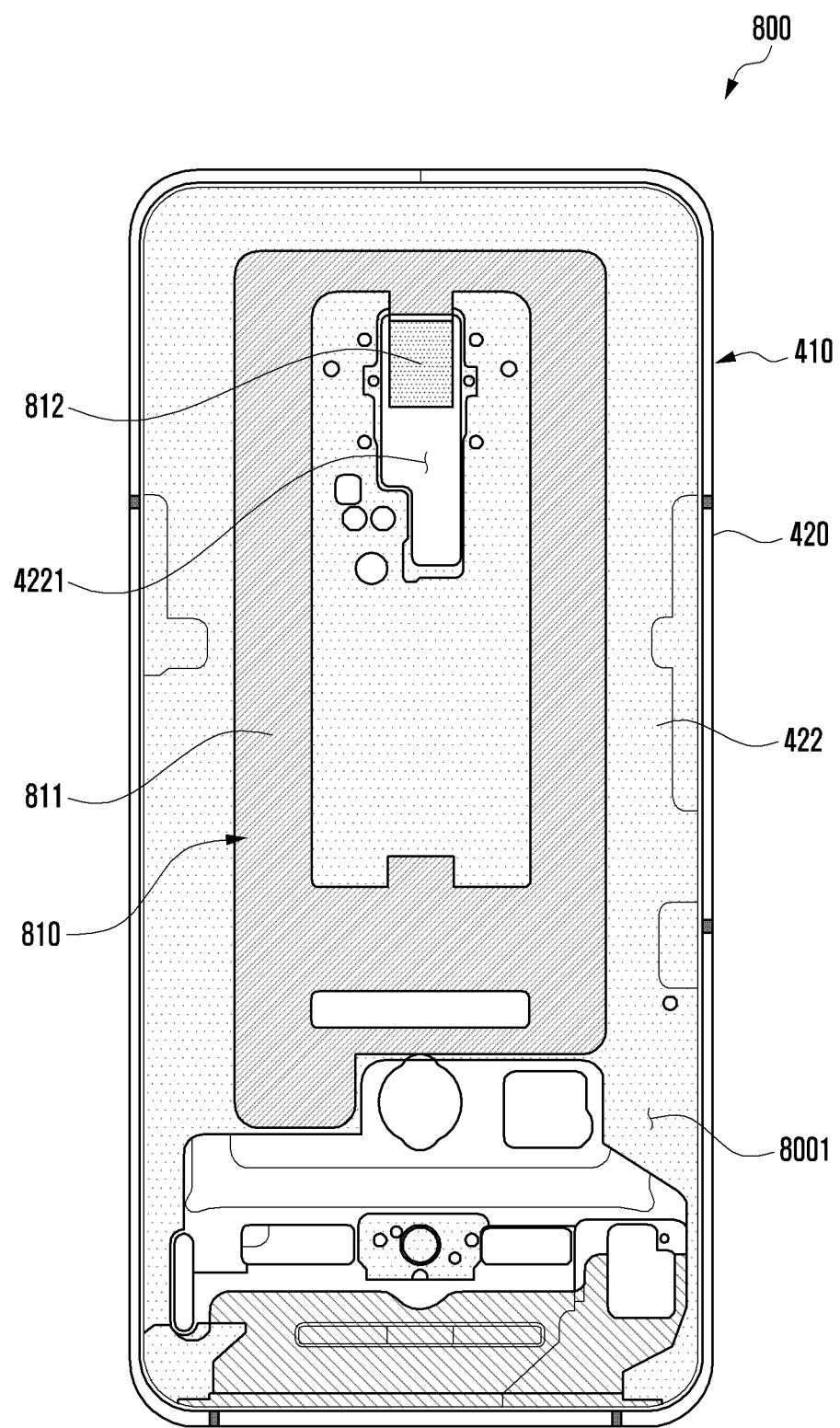
FIG. 8 illustrates an electronic device including an adhesive member according to an embodiment.

FIG. 8 illustrates an electronic device including an adhesive member according to an embodiment.

The electronic device 800 in FIG. 8 may be similar, at least in part, to the electronic device 100 illustrated in FIG. 1 or the electronic device 300 illustrated in FIG. 3.

Referring to FIG. 8, the electronic device 800 includes the support member 422 disposed in an inner space 8001 of the housing 410. The support member 422 includes an intermediate plate extended from the lateral member 420 of the housing 410 into the inner space 8001. The electronic device 800 may include a display disposed on the support member 422. The electronic device 800 includes an adhesive member 810 (e.g., a double-sided tape) disposed between the support member 422 and the display. The display may be securely fixed on the support member 422 through the adhesive member 810.

The adhesive member 810 includes an adhesive portion 811 attached to the support member 422, and a handle portion 812 extended from at least a part of the adhesive portion 811. The above-described masking film member is attached to the handle portion 812. The adhesive member 810 may be punched to have a desired shape together with the masking film member attached to a release liner prior to UV irradiation through the above-described process, and then an adhesive force of the handle portion 812 may be reduced or removed through the UV irradiation. Thus, when the adhesive member 810 is detached from the support member 422, e.g., for repair or replacement of the display, it is possible to easily detach the adhesive member 810 through the handle portion 812 having the reduced or removed adhesive force. The support member 422 has an opening 4221 for accommodating the handle portion 812 to help an easy detachment of the adhesive member 810.

FIG. 9 illustrates a cross-sectional view of an electronic device including adhesive members according to an embodiment.

The electronic device 900 illustrated in FIG. 9 may be similar, at least in part, to the electronic device 100 illustrated in FIG. 1 or the electronic device 300 illustrated in FIG. 3.

Referring to FIG. 9, the electronic device 900 includes a housing 910 that includes a front cover 930, a rear cover 940 facing a direction ① opposite to the front cover 930, and a lateral member 920 surrounding an inner space 9001 between the front cover 930 and the rear cover 940. The lateral member 920 includes a conductive member 921 and a polymer member 922 injected into the conductive member 921. The electronic device 900 includes a support member 911 extended from the lateral member 920 into the inner space 9001. The support member 911 supports, at least in part, a display 931 disposed to be visible from the outside through the front cover 930.

The rear cover 940 includes a flat portion 9401 and a curved portion 9402 extended with a certain curvature from the flat portion 9401 to the lateral member 920. The rear cover 940 may be fixed to the lateral member 920 through the adhesive member 950 disposed between the curved portion 9402 and the lateral member 920. The rear cover 940 is attached in direction ② perpendicular to the lateral member 920. In this case, it may be difficult to apply the adhesive member 950 disposed between the curved portion 9402 and the lateral member 920 to the end of the rear cover 940 due to a sweep phenomenon caused by a vertical mounting direction of the rear cover 940. For example, when the adhesive member 950 is attached up to the end of the curved portion 9402 in a direction perpendicular to the lateral member 920, the end of the adhesive member 950 may be curled in direction ①, opposite to the mounting direction by a shear friction force with the lateral member 920. To prevent this, the adhesive member 950 may not be applied to the end of the curved portion 9402. However, the absence of the adhesive member 950 at the end of the curved portion 9402 causes a space between the lateral member 920 and the end of the curved portion 9402 of the rear cover 940, so that the rear cover 920 may be damaged due to an external impact.

According to an embodiment, when the adhesive member 950 to which a masking film member 953 having a reduced or removed adhesive force is attached is interposed between the rear cover 940 and the lateral member 920, the masking film member 953 may offer a slip section at the end of the curved portion 9402. This may prevent a curling phenomenon of the adhesive member 950 due to the frictional force between the adhesive member 950 and the lateral member 920, i.e., maintain a state of being filled with the adhesive member 950, thereby preventing the rear cover 940 from being damaged due to an external impact. Through the above-described process, the adhesive member 950 may be punched to have a desired shape together with the masking film member 953 attached to a release liner prior to UV irradiation, and then an adhesive force of the masking film member 953 may be reduced or removed through the UV irradiation. Accordingly, the rear cover 940 may be reliably attached to the lateral member 920 through the adhesive member 950 that includes the masking film member 953 with the adhesive force reduced or removed and fills the end space between the rear cover 940 and the lateral member 920.

As described above, the adhesive member including the above-described masking film member from which the adhesive force can be removed (or reduced) through UV irradiation may also be used to expand an area where a cover member having a curved surface is disposed.

The front cover 930 also has a flat portion 9301 and a curved portion 9302 extended from the flat portion 9301. In addition, another adhesive member 960 disposed between the curved portion 9302 and the lateral member 920 may also have a masking film member 963, which is substantially the same as the masking film member 953 of the adhesive member 950. Even if the adhesive member 960 is disposed between the display 931 and the lateral member 920, the same masking film member 963 may be applied. The electronic device 900 may further include an arrangement of the adhesive member 450 as illustrated in FIG. 5A and/or an arrangement of the adhesive member 810 as illustrated in FIG. 8.

Figure 10A:
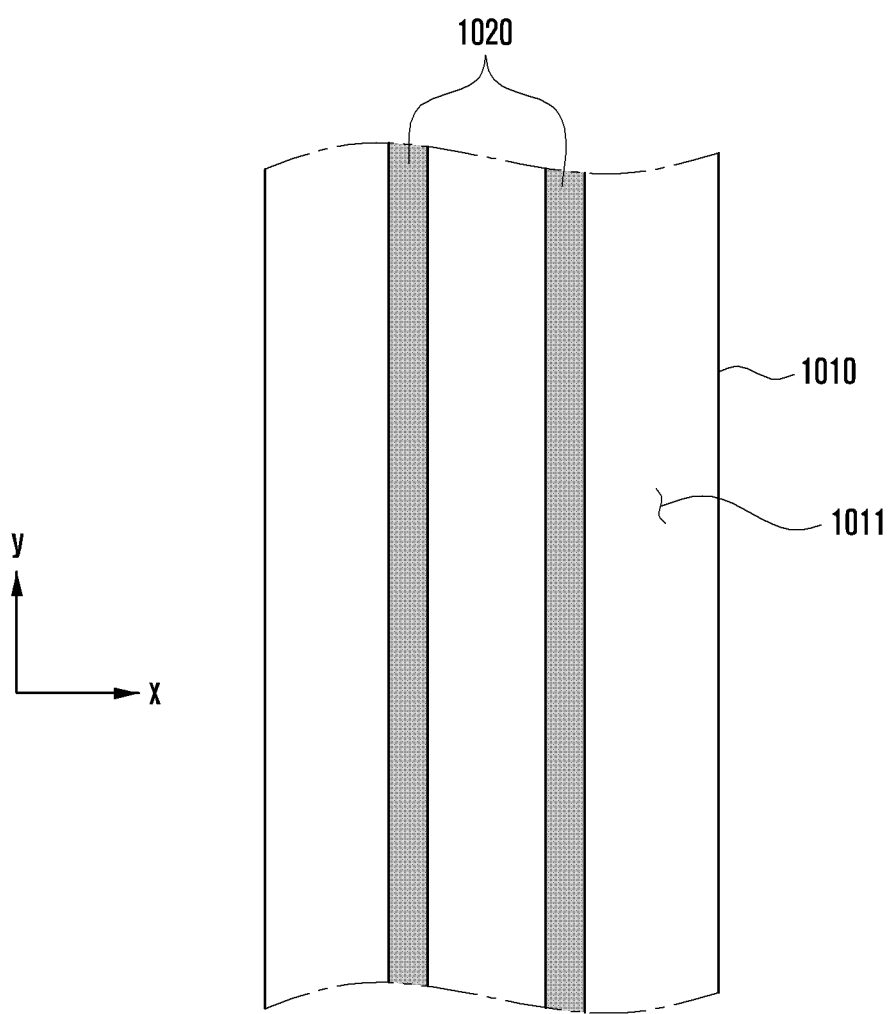
FIGS. 10A and 10B illustrates adhesive members including a photosensitive adhesive layer according to an embodiment.
Figure 10B:
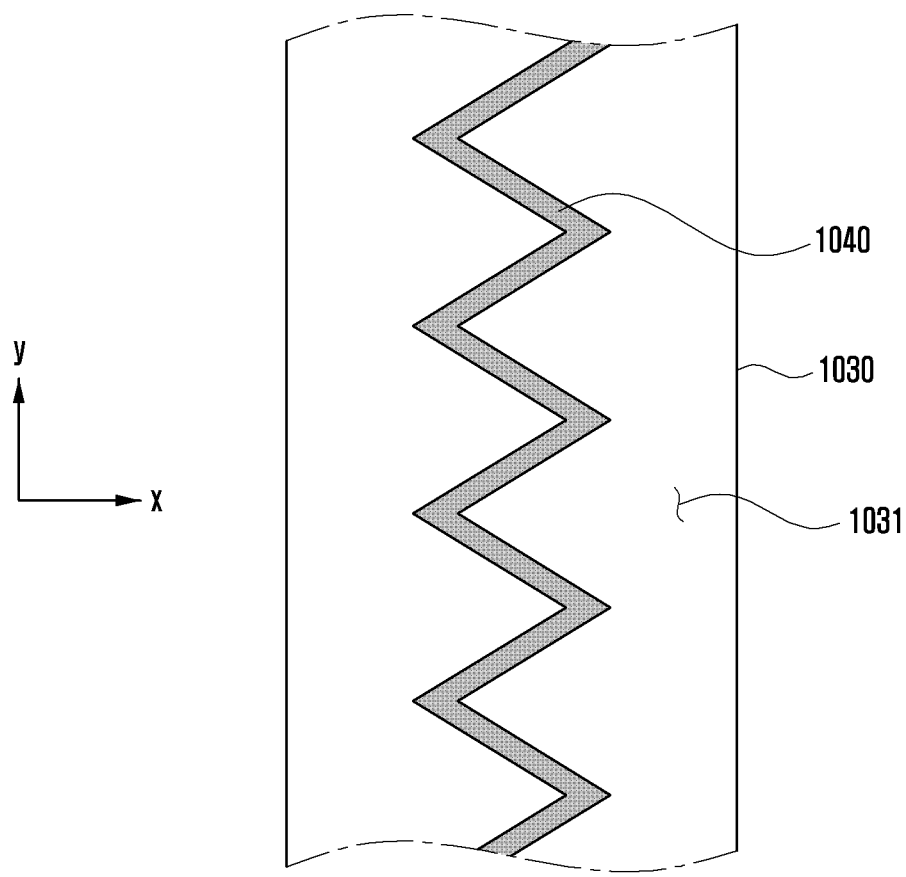

FIGS. 10A and 10B illustrate adhesive members including a photosensitive adhesive layer according to an embodiment.

Referring to FIGS. 10A and 10B, the adhesive member 1010 or 1030 including a masking film member 1020 or 1040 may be used for bonding certain structures that require a high adhesive force and a slip property in a shear direction. The masking film member 1020 or 1040 may be laminated on an adhesive surface 1011 or 1031 of the adhesive member 1010 or 1030 in a predetermined shape. The adhesive member 1010 or 1030 may maintain a high adhesive force during attachment, and also secure the shearing fluidity by being moved through the masking film member 1020 or 1040 when a load is applied in a slip direction.

As illustrated in FIG. 10A, the adhesive member 1010 may be disposed on the adhesive surface 1011 along a longitudinal direction (e.g., the y-axis direction), and may include at least two masking film members 1020 formed to have a straight line shape having a certain width. As illustrated in FIG. 10B, the adhesive member 1030 may include the masking film member 1040 formed to have a zigzag shape on the adhesive surface 1031 along the longitudinal direction (e.g., the y-axis direction).

The masking film member applied to the adhesive member may have various shapes and/or arrangement structures other than the above examples, depending on shapes and/or functions of structures to be bonded.

The adhesive member includes the sensitive adhesive layer containing the photo-initiator, thereby not only providing an adhesive force with the release liner to improve processability before UV irradiation, but also preventing the overlapped conductive pattern from being damaged through a reduced or removed adhesive force after the UV irradiation. As a result, the adhesive member can contribute to improving the reliability of the electronic device.

According to an embodiment, an electronic device e.g., the electronic device 400 in FIG. 4) may include a housing (e.g., the housing 410 in FIG. 4) including a support member (e.g., the support member 421 in FIG. 4) in an inner space thereof, at least one conductive pattern (e.g., the conductive pattern 4211 in FIG. 4) disposed on the support member, a cover member (e.g., the cover member 440 in FIG. 4) combined with at least a part of the housing, a first adhesive member (e.g., the adhesive member 450 in FIG. 4) disposed between the housing and the cover member to be overlapped at least in part with the at least one conductive pattern when the cover member is viewed from above, and a first masking film member (e.g., the masking film member 453 in FIG. 4) attached to the first adhesive member and disposed between the first adhesive member and the at least one conductive pattern to be overlapped with the at least one conductive pattern when the cover member is viewed from above. A surface of the first masking film member facing the at least one conductive pattern may include a photosensitive adhesive layer (e.g., the photosensitive adhesive layer 4531 in FIG. 5B) containing a photo-initiator and having an adhesive force reduced or removed through irradiation of UV rays.

The at least one conductive pattern may include an antenna pattern disposed on the support member.

The first adhesive member may be formed between the cover member and the housing to have a closed loop shape along an edge of the cover member.

The first adhesive member may include an edge portion (e.g., the edge portion 451 in FIG. 4) formed between the cover member and the housing along the edge of the cover member, and at least one extended portion (e.g., the extended portion 452 in FIG. 4) extended from at least a part of the edge portion to at least a part of the support member, wherein the first masking film member may be attached to at least a part of the extended portion.

The housing may include a front cover (e.g., the front cover 930 in FIG. 9), a rear cover (e.g., the rear cover 940 in FIG. 9) facing in a direction opposite to the front cover, and a lateral member (e.g., the lateral member 920 in FIG. 9) surrounding a space (e.g., the space 9001 in FIG. 9) between the front cover and the rear cover, wherein the support member (e.g., the support member 911 in FIG. 9) may be extended at least partially from the lateral member.

The rear cover includes a flat portion (e.g., the flat portion 9401 in FIG. 9) and a curved portion (e.g., the curved portion 9402 in FIG. 9) extended with a specific curvature from the flat portion to the lateral member, and the electronic device may further include a second adhesive member (e.g., the adhesive member 950 in FIG. 9) disposed in a space between the curved portion and the lateral member.

The electronic device may further include a second masking film member (e.g., the masking film member 953 in FIG. 9) disposed from at least a part of the second adhesive member to a position facing an end of the rear cover between the second adhesive member and the lateral member, and a surface of the second masking film member facing the lateral member may include a photosensitive adhesive layer containing a photo-initiator and having an adhesive force reduced or removed through irradiation of UV rays.

The electronic device may further include a display (e.g., the display 330 in FIG. 3) disposed in the inner space to be visible from outside through at least a part of the front cover.

The electronic device may further include a third adhesive member (e.g., the adhesive member 810 in FIG. 8) disposed between the support member and the display.

The electronic device may further include a third masking film member disposed at least partially between the third adhesive member and the support member, and a surface of the third masking film member facing the support member may include a photosensitive adhesive layer containing a photo-initiator and having an adhesive force reduced or removed through irradiation of UV rays.

The third adhesive member may include an adhesive portion (e.g., the adhesive portion 811 in FIG. 8) and a handle portion (e.g., the handle portion 812 in FIG. 8) extended from the adhesive portion to detach the third adhesive member, and the third masking film member may be formed on the handle portion.

The photosensitive adhesive layer may be colored through the irradiation of UV rays.

The masking film member may be formed of a polymer film.

The adhesive force of the photosensitive adhesive layer may be reduced or removed through the irradiation of UV rays before the adhesive member is attached to a target structure.

According to an embodiment, a method for manufacturing an adhesive member may include attaching a masking film base material to a release liner (e.g., the release liner 460 in FIG. 7) through a photosensitive adhesive layer before irradiation of light, punching the masking film base material and removing scrap, attaching an adhesive member to the masking film base material on the release liner, punching the adhesive member and the release liner and removing scrap, and irradiating light onto the photosensitive adhesive layer through the release liner to reduce or remove an adhesive force of the photosensitive adhesive layer.

Irradiating light onto the photosensitive adhesive layer may include irradiating UV rays.

The photosensitive adhesive layer may be colored through the irradiation of UV rays.

The release liner may have transparency to allow the photosensitive adhesive layer to be visually identified.

While the disclosure has been particularly shown and described with reference to exemplary embodiments thereof, it will be understood by those skilled in the art that various changes in form and details may be made therein without departing from the scope of the subject matter as defined by the appended claims and any equivalents thereof.

What is claimed is:

1. An electronic device, comprising:
   a housing comprising:
      a front cover;
      a rear cover facing in a direction opposite to the front cover and comprising a flat portion and a curved portion that extends with a specific curvature from the flat portion;
      a lateral member surrounding a space between the front cover and the rear cover; and
      a support member in an inner space thereof;
   a conductive pattern disposed on the support member;
   a cover member combined with the housing;
   a first adhesive member disposed between the housing and the cover member to be overlapped at least in part with the conductive pattern, when the cover member is viewed from above;
   a first masking film member attached to the first adhesive member and disposed between the first adhesive member and the conductive pattern to be overlapped with the conductive pattern when the cover member is viewed from above;
   a second adhesive member disposed in a space between the curved portion and the lateral member; and
   a second masking film member disposed from a part of the second adhesive member to an end of the second adhesive member adjacent to an end of the curved portion between the second adhesive member and the lateral member,
   wherein a surface of the first masking film member facing the conductive pattern ncludes a photosensitive adhesive layer including a photo-initiator and having a reduced or removed adhesive force through irradiation of ultraviolet (UV) rays, and
   wherein a surface of the second masking film member facing the lateral member includes a photosensitive adhesive layer configured to have a reduced or removed adhesive force through irradiation of UV rays so as to reduce a frictional force between the second adhesive member and the lateral member.

2. The electronic device of claim 1, wherein further comprising
   a printed circuit board (PCB) disposed in the inner space; and
   a wireless communication circuit configured to at least one of transmit or receive a radio signal through the conductive pattern.

3. The electronic device of claim 2, wherein the conductive pattern is electrically connected to the wireless communication circuit disposed on the PCB.

4. The electronic device of claim 1, wherein the first adhesive member has a closed loop shape along an edge of the cover member.

5. The electronic deviceof claim 1, wherein the fit adhesive member comprises:
   an edge portion formed between the cover member and the housing along the edge of the cover member; and an extended portion that extends from the edge portion to the support member,
wherein the first masking film member is attached to the extended portion.

6. The electronic device of claim 1, further comprising a display disposed in the inner space to be visible from outside through the front cover.

7. The electronic device of claim 6, further comprising a third adhesive member disposed between the support member and the display.

8. The electronic device of claim 7, further cam ing a third masking film member disposed between the third adhesive member and the support member, and
wherein a surface a the third masking film member facing the support member includes a photosensitive adhesive layer containing a photo-initiator and having a reduced or removed adhesive force through irradiation of UV rays.

9. The electronic device of claim 8, wherein the third adhesive member comprises:
an adhesive portion; and
a handle portion extended from the adhesive portion to detach the third adhesive member, and
wherein the third masking film member is formed on the handle portion.

10. The electronic device of claim 1, wherein the photosensitive adhesive layer is colored through the irradiation of UV rays.

* * * * *